United States Patent

[11] 3,623,578

| [72] | Inventor | Robert W. Plume<br>Utica, Mich. |
|---|---|---|
| [21] | Appl. No. | 51,526 |
| [22] | Filed | July 1, 1970 |
| [45] | Patented | Nov. 30, 1971 |
| [73] | Assignee | General Motors Corporation<br>Detroit, Mich. |

[54] COMBINED SELF-ADJUSTER AND PARKING BRAKE ACTUATING MECHANISM
2 Claims, 3 Drawing Figs.

[52] U.S. Cl. .................................................. 188/79.5 P,
188/106 A, 188/196 P
[51] Int. Cl. ............................................................ F16d 65/54
[50] Field of Search .......................................... 188/79.5 K,
79.5 P, 79.5 GT, 79.5 B, 79.5 GC, 196 B, 196 P,
106 A, 106 F

[56] References Cited
UNITED STATES PATENTS

| 1,825,555 | 9/1931 | Stern ............................. | 188/196 B |
| 2,292,017 | 8/1942 | Smith ............................ | 188/79.5 B |
| 3,554,332 | 1/1971 | Harrison ........................ | 188/106 A X |

FOREIGN PATENTS

| 1,159,219 | 12/1963 | Germany ....................... | 188/79.5 P |

*Primary Examiner*—Duane A. Reger
*Attorneys*—W. E. Finken and D. D. McGraw

ABSTRACT: An improved combination parking brake actuating and self-adjuster mechanism for a drum brake wherein a rigid strut engages a cable operated lever pivoted upon the first shoe and transmits parking brake actuating force to the second shoe. A one-way clutch mechanism is connected to the first shoe through a lost motion connection and is movable upon the strut in one direction only so as to extend the effective length of the strut assembly during parking brake actuation and thereby reposition and hold the shoes in further apart relationship to adjust for lining wear.

PATENTED NOV 30 1971  3,623,578

INVENTOR.
Robert W. Plumc
BY
D. D. McGraw
ATTORNEY

COMBINED SELF-ADJUSTER AND PARKING BRAKE ACTUATING MECHANISM

The present invention comprises an improved combination parking brake actuating and self-adjuster mechanism for a drum brake. A parking brake actuating lever is pivotally attached to the first shoe and carries a strut which engages the second shoe. The first show is attached to the strut through a one-way clutch mechanism. Upon actuation of the parking brake lever, the braking force is transmitted through the strut to the second shoe forcing the shoes to engage the brakedrum. As the lever forces the first shoe and the attached clutch mechanism in one direction and the strut and second shoe in the other direction, the clutch mechanism advances on the strut a distance equal to the brake lining wear resulting from the previous hydraulic actuations, thereby extending the length of the strut assembly to reposition and hold the shoes further apart to adjust for the lining wear. A lost motion connection between the clutch and the first shoe allows the shoes to retract only a predetermined amount following each actuation. In this novel mechanism, the rigid strut transmits the parking brake actuating force so that the adjuster clutch mechanism need withstand only that force required to hold the shoes at their adjusted position.

Figure 1:
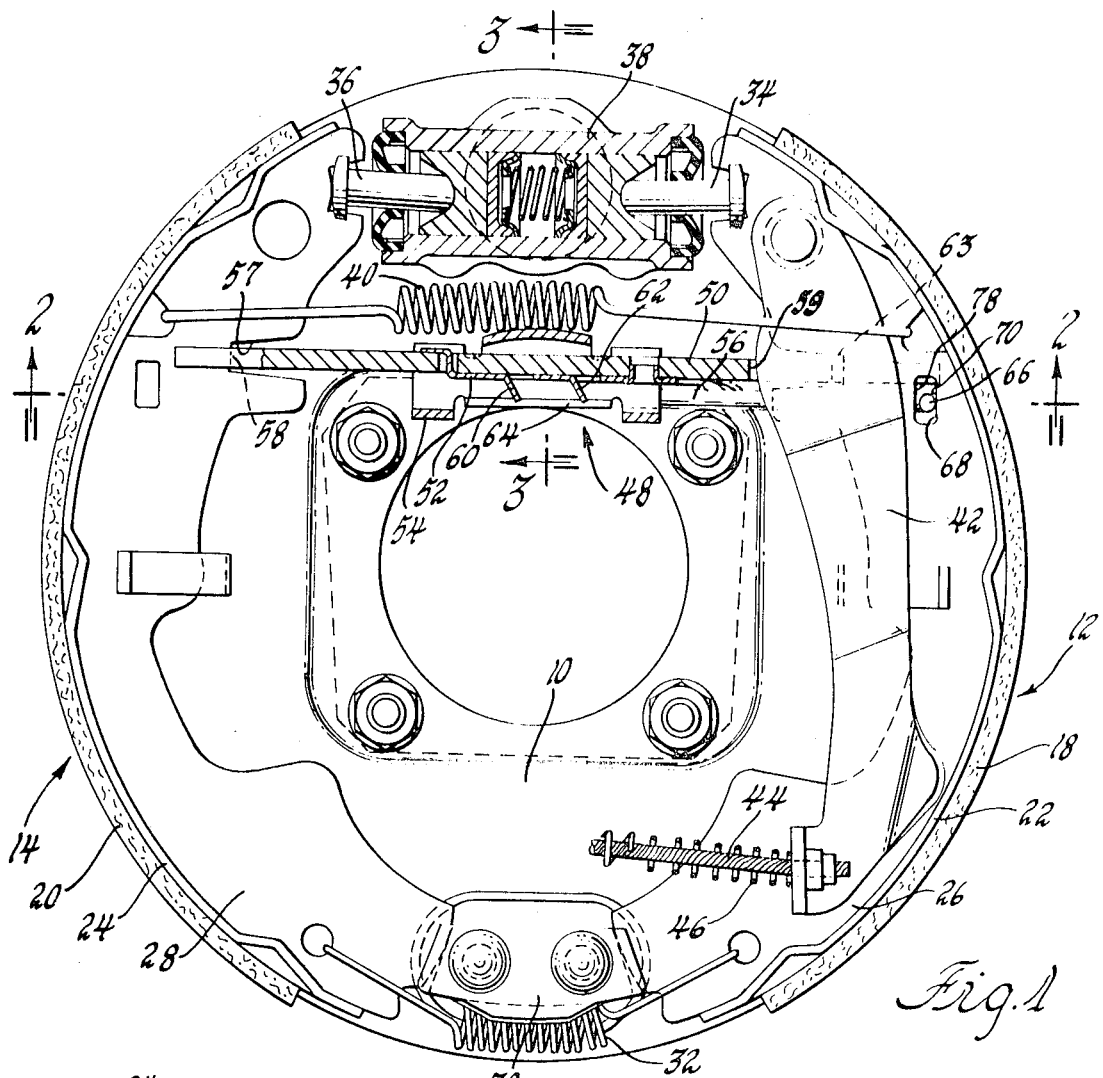
FIG. 1 is a cross section view of a brake mechanism showing an embodiment of the invention and having parts broken away.
Figure 2:
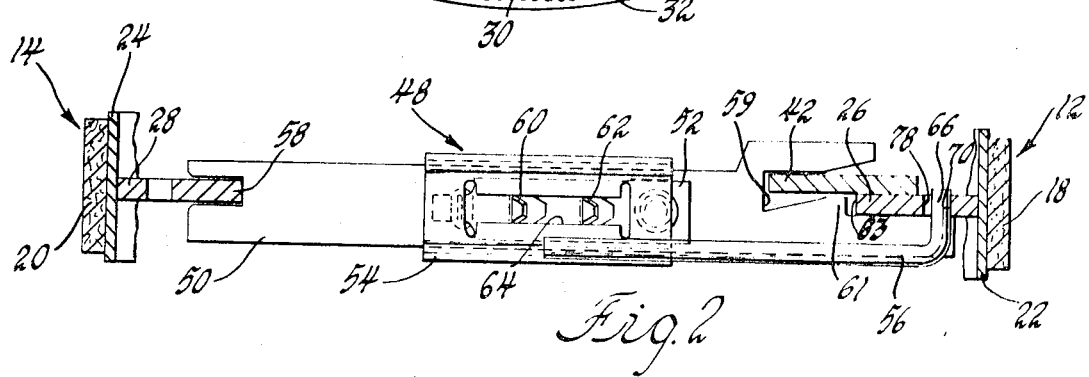
FIG. 2 is a cross section view of the strut assembly taken in the direction of arrow 2—2 of FIG. 1.
Figure 3:
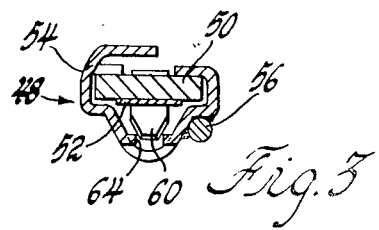
FIG. 3 is a cross section view of the strut assembly taken in the direction of arrow 3—3 of FIG. 1.

The brake in which the invention is incorporated includes a stationary backing plate 10 which is secured to the vehicle axle housing. A brakedrum not shown is carried by the rotating wheel of the vehicle. Brakeshoes 12 and 14 are supported on the backing plate 10 and include linings 18 and 20, rim portions 22 and 24 to which the linings are respectively attached and web portions 26 and 28 which support the rim portions. Anchor 30 is attached to backing plate 10 and is engaged by the adjacent ends of brakeshoes 12 and 14. Retaining spring 32 is secured to the webs 26 and 28 of brakeshoes 12 and 14 respectively and holds the brakeshoes in engagement with the anchor 30.

The opposite adjacent ends of the webs 26 and 28 of brakeshoes 12 and 14 respectively engage plunger members 34 and 36 of hydraulic wheel cylinder 38 which is mounted on backing plate 10 and urges the brakeshoes 12 and 14 into engagement with the brakedrum when pressurized hydraulic fluid is delivered from the master cylinder. A retracting spring 40 engages the webs 26 and 28 of the brakeshoes 12 and 14 respectively at their ends adjacent hydraulic wheel cylinder 38 and urges the brakeshoes 12 and 14 away from the brakedrum.

Parking brake actuating lever 42 is pivotally connected to the web 26 of brakeshoe 12 adjacent hydraulic wheel cylinder 38. Brake cable 44 is connected to the other end of brake-actuating lever 42 and is encircled by release spring 46 which is grounded to the backing plate 10 to continuously urge lever 42 into abutment with rim 22 thereby defining the fully disengaged position of lever 42.

Strut assembly 48 operatively connects brakeshoes 12 and 14 and lever 42 to provide the combined self-adjusting and parking brake actuating mechanism of the invention. Strut assembly 48 includes strut 50, locking spring 52, retainer 54, and rod 56. The abutment 58 of strut 50 is supported in recess 57 of shoe 14 and the abutment 59 of strut 50 is supported on lever 42. Abutment 61 of strut 50 is supported in recess 63 of shoe 12 to hold strut 50 in proper alignment with lever 42. Locking spring 52, retainer 54, and rod 56 cooperate to form a clutch device slidable in one direction in relation to strut 50. Locking spring 52 is mounted on strut 50 and includes tangs 60 and 62 which extend into engagement with slot 64 of retainer 54 which is slidably mounted on strut 50. Rod 56 is attached to retainer 54 and has a laterally bent end 66 which engages the oversized hole 68 in web 26 of shoe 12 to form a lost motion connection which allows the shoes to retract only a predetermined distance after actuation.

Referring to FIG. 1, which shows the brake assembly in the normal rest position, the tension in retracting spring 40 has withdrawn the shoes 12 and 14 away from the brakedrum with recess 57 of shoe 14 engaging abutment 58 of strut 50 and the laterally bent end 66 of rod 56 engaging the outer wall 70 of hole 68 to limit retraction of the shoes from the drum. The tension of retracting spring 40 acts through abutment 58 of strut 50 and through the end 66 of rod 56 urging strut assembly 48 to collapse. The tangs 60 and 62 of locking spring 52 frictionally engage the slot 64 of retainer 54 to prevent relative motion of strut 50 and rod 56 in the collapsing direction.

Upon service actuation, fluid pressure received from the master cylinder enters hydraulic wheel cylinder 38 and acts on the wheel cylinder pistons, which force plunger members 36 and 38 outwardly, carrying shoes 12 and 14 into braking engagement of the brakedrum. End 66 of rod 56 pulls away from the outer wall 70 of hole 68 as the brakeshoes move outwardly and abutment 58 of strut 50 pulls away from recess 57 of shoe 14 to allow the brakeshoes further freedom of brake engaging travel. Upon release of the hydraulic pressure, the shoes retract at the urging of retracting spring 40 and resume the normal rest position as shown in FIG. 1.

Parking brake actuation is initiated by tension applied to the brake cable 44. Lever 42 pivots on web 26 of shoe 12 into engagement with abutment 59 of strut 50 and causes abutment 58 of strut 50 to operatively engage the recess 57 of shoe 14. Continued pivoting of lever 42 forces the shoes 12 and 14 outwardly into braking engagement of the brakedrum.

If brake lining wear has resulted from the hydraulic actuations since the most recent parking brake actuation, the laterally bent end 66 of rod 58 engages the inner wall 78 of hole 68 prior to engagement of the shoes 12 and 14 with the brakedrum. Thereafter, rod 56 and retainer 54 travel outwardly with shoe 12 and strut 50 travels outwardly in the opposite direction with shoe 14 causing strut assembly 48 to extend in length through the travel of retainer 54 and the rod 56 in relation to strut 50 as the parking brake actuating force overcomes the frictional engagement of tangs 60 and 62 with slot 64 of the retainer 54. Upon subsequent release of tension from cable 44, the shoes retract through the lost motion connection of rod 56 and hole 68 and are held at an adjusted further apart relationship due to the extended effective length of the strut assembly 48 as measured from abutment 58 of strut 50 to end 66 of rod 56.

The resulting combined parking brake actuating and self-adjusting mechanism offers a simple and economical construction which provides a rigid heavy-duty strut to transmit parking brake actuating force and a simple lightweight adjuster clutch which need not withstand the brake actuating force.

I claim:

1. In a brake having a fixed member, a rotatable drum, first and second shoes and service actuating means, a combination brake self-adjusting and auxiliary actuating mechanism comprising:

a lever pivotally attached to one end to said first shoe adjacent said service actuating means, means operating the other end of said lever to provide lever actuation;

spring means operatively connecting said first and second shoes and continuously urging retraction of said shoes away from said drum;

a strut assembly connecting said shoes at least following retraction of said shoes to limit shoe retraction, said strut assembly including;

a strut having a first end engageable upon lever actuation with said lever intermediate the ends of said lever, the second end of said strut engageable with said second shoe upon lever actuation whereby said first and second shoes are urged outwardly into braking engagement with said drum, a one-way clutch means connecting said strut and said first shoe, said one-way clutch means movable in relation to said strut in a direction away from said second shoe, whereby upon lever actuation said strut and said one-way clutch means more relatively oppositely to lengthen said strut assembly an amount corresponding to shoe wear resulting from previous service actuations, said one-way clutch mechanism resisting the shoe-retracting force of said spring means to maintain the adjusted length of said strut assembly and thereby hold said shoes in adjusted separated relationship, and lost motion means in connection between said first shoe and said one-way clutch means, said lost motion means limiting retracting movement of said shoes relative to said one-way clutch means to a predetermined amount after each of said aforementioned actuations.

2. In a brake having a fixed member, a rotatable drum, first and second shoes and service-actuating means, a combination brake self-adjusting and auxiliary actuating mechanism comprising:

a lever pivotally attached to one end to said first shoe adjacent said service actuating means, a cable attached to the other end of said lever to provide lever actuation;

spring means operatively connecting said first and second shoes and continuously urging retraction of said shoes away from said drum;

a strut assembly connecting said shoes at least following retraction of said shoes to limit shoe retraction, said strut assembly including;

a strut having a first end engageable upon lever actuation with said lever intermediate the ends of said lever, the second end of said strut engageable with said second shoe upon lever actuation whereby said first and second shoes are urged outwardly into braking engagement with said drum, a one-way clutch means connecting said strut and said first shoe, said clutch means including, a retainer slidably mounted upon said strut and having a slot extending longitudinally of said strut, a rod having one end attached to said retainer and having a laterally bent other end engaging with definite play a hole in said first shoe so as to provide a lost motion connection between said first shoe and said one-way clutch means, said lost motion connection limiting retracting movement of said shoes relative to said rod to a predetermined amount after each of said aforementioned actuations, a locking spring mounted upon said strut and having a plurality of tangs angularly projecting therefrom into engagement with said slot of said retainer, the frictional engagement between said retainer slot and said locking spring tangs being overcome upon lever actuation to allow said strut and said retainer to move relatively oppositely to lengthen said strut assembly an amount corresponding to shoe wear resulting from previous service actuations, said tangs frictionally locking said strut and said retainer to resist the shoe retracting force exerted by said spring means to maintain the adjusted length of said strut assembly and thereby hold said shoes in adjusted separated relationship.

* * * * *

UNITED STATES PATENT OFFICE
CERTIFICATE OF CORRECTION

Patent No. 3,623,578 Dated November 30, 1971

Inventor(s) Robert W. Plume

It is certified that error appears in the above-identified patent and that said Letters Patent are hereby corrected as shown below:

Column 1, line 7, "show" should read -- shoe --.
Column 2, line 3, before "actuation" insert -- each --; line 61, after "attached" delete "to" and insert -- at --.
Column 3, line 5, "more" should read -- move --; and line 21, after "attached", delete "to" and substitute -- at --.

Signed and sealed this 25th day of July 1972.

(SEAL)
Attest:

EDWARD M. FLETCHER, JR.
Attesting Officer

ROBERT GOTTSCHALK
Commissioner of Patents